Patented Oct. 17, 1950

2,526,108

UNITED STATES PATENT OFFICE 2,526,108

PROCESS OF PREPARING ALLYLIC SUBSTITUTED ACETIC ACIDS

Richard T. Arnold, St. Paul, Minn.

No Drawing. Application December 31, 1947,
Serial No. 795,121

7 Claims. (Cl. 260—515)

The present invention relates to the introduction of allylic groups into the alpha position of the carbonyl group of esters of aromatic-substituted acids, and more particularly it relates to the introduction of allylic groups into the alpha position of aromatic-substituted acetic acid. These compounds are useful in various organic syntheses, and particularly in the production of certain analgesics, for example the production of 4,4-diphenyl-6-dimethylamino-heptanone-3 from diphenyl allyl acetic acid.

In the past diphenyl allyl acetic acid has been obtained by the reaction of benzyl diphenylacetate with an allyl halide in the presence of some strong base, which results in the introduction of the allyl group on the alpha-carbon atom. Thereafter the ester group is removed by hydrolysis. This method has left much to be desired inasmuch as the hydrolysis step entails various difficulties including the distinct possibility of lactone formation. According to the present method this hydrolysis step is obviated and the processing proceeds to good yields in a simple manner.

Broadly the invention involves the rearrangement of an allylic ester of aromatic-substituted acetic acids such that the allyl group is introduced into the alpha position. This reaction is found to occur in the presence of basic reagents.

It is, therefore, an object of the present invention to provide a process for the introduction of allylic groups into the alpha position of an aromatic-substituted acetic acid.

It is a further object of the present invention to provide a novel process for producing diphenyl allyl acetic acid and related compounds.

The invention involves the conversion of esters of the following type:

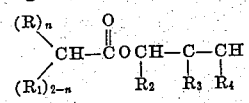

into allylic substituted acetic acids having the following formula:

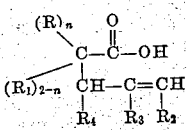

in which R is an aromatic radical, for example phenyl, substituted phenyl, naphthyl, and the like; $R_1$ is an aliphatic hydrocarbon radical, for example methyl, ethyl, propyl, and the like; $R_2$, $R_3$, and $R_4$ may be alike or different and may be hydrogen or aliphatic radicals, such as methyl, ethyl, propyl, and the like; and $n$ is an integer not greater than 2.

The present invention may be carried out on any of the starting materials contemplated herein by means of a basic reagent which is able to bring about the ionization of the original ester to form an anion which then undergoes spontaneous internal rearrangement to form the anion of the desired acid. This is shown by the following equation:

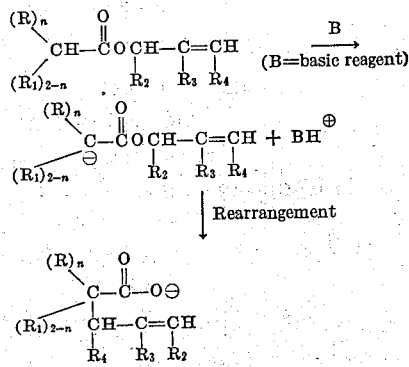

There is a wide variety of basic reagents which are capable of effecting the desired ionization of the original ester. In general hydrides, amides, and alkoxides of active metals such as sodium, potassium, and the like, and also Grignard reagents, will bring about this rearrangement of allylic esters. Suitable basic reagents include the following: NaH, KH, $NaNH_2$, $NaN(C_2H_5)_2$, $KNH_2$, $NaOCH_3$, $NaOC_2H_5$, $KOC(CH_3)_3$, and RMgX where R is alkyl or aryl, and X is Cl, Br, or I.

A typical reaction may be illustrated by means of the following equation showing the production of diphenyl allyl acetic acid by the reaction of sodium hydride on allyl diphenyl acetate:

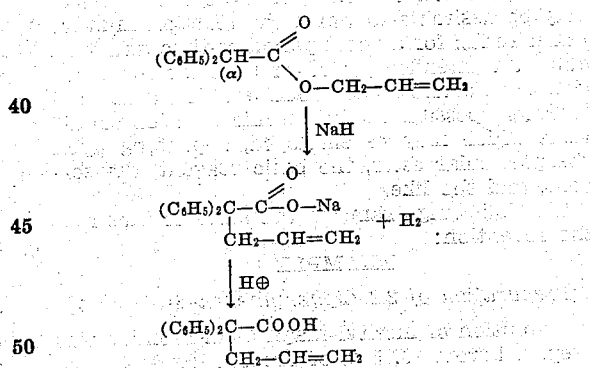

This method involves the direct substitution of the alpha-hydrogen atom by the allyl group when the allyl ester is treated with a strong base to form the sodium salt of alpha-allyl diphenyl acetic acid directly by an intra-molecular rearrangement of the anion formed from the ester by means of the strong base. In this manner the difficulty of hydrolyzing the ester involved in previously used syntheses is completely eliminated.

Another advantage of the present synthesis lies in the ability to prepare isomeric allylic acids by the appropriate choice of starting materials. Thus it has been shown that the allylic group in the original allylic ester undergoes an inversion (alpha, gamma) during the internal rearrangement. This has been demonstrated by the synthesis of alpha-crotyl-diphenyl acetic acid from isocrotyl diphenyl acetate and by the synthesis of alpha-isocrotyl diphenyl acetic acid from n-crotyl diphenyl acetate. These reactions are illustrated as follows:

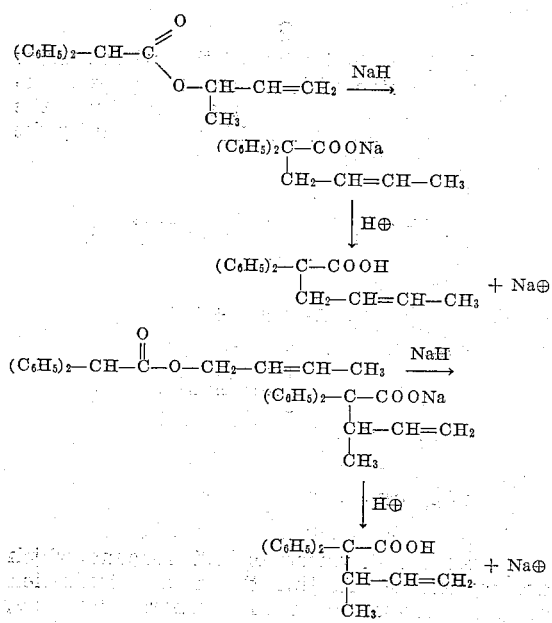

These isomeric acids cannot be made directly in a pure condition by any of the older methods.

The reaction may be carried out preferably under anhydrous conditions by simply mixing the allyl ester with the basic reagent in a suitable inert solvent, which includes ethers such as diethyl ether, dioxane, a wide variety of hydrocarbons such as benzene, toluene, petroleum ether and the like, alcohols when their alkoxides are employed as the basic reagent. In some instances the reaction is exothermic and proceeds without the application of heat. In other instances it may be desirable to warm the reaction mixture under reflux for a short period of time and then allow an extended period of time for the reaction to be carried out. Considerable variation is therefore possible in the specific reaction conditions which may be employed, depending upon the particular ester, the basic reagent, the solvent, and the like.

The following examples will serve to illustrate the invention:

EXAMPLE 1

*Preparation of 2,2-diphenylhexen-4-oic acid*

A solution of mesityl-magnesium bromide was prepared from 10.75 g. of bromomesitylene, 1.30 g. of magnesium turnings and 50 ml. of anhydrous ether, the reaction being started without entrainment in the usual manner. (Barnes, "Organic Syntheses," 21, 78 (1941).) After the mixture was refluxed six hours to complete formation of the Grignard reagent, it was filtered through glass wool and added to a stirred solution of 11.5 g. of isocrotyl diphenyl acetate in 50 ml. of anhydrous ether. A slightly exothermic reaction was observed. When the addition was completed the solution was warmed under reflux for thirty minutes and then was allowed to stand at room temperature forty hours. It was decomposed with slightly acidified ammonium chloride solution. The ether solution was extracted thoroughly with five per cent sodium hydroxide solution and washed with water. It was dried over sodium sulfate, filtered and distilled to yield 4.6 g. of mesitylene (B. P. 161–162° C. (745 mm.); $n_D^{24}$ 1.4961) and 0.9 g. of unchanged ester (B. P. 140–165° C. (8 mm.); M. P. 56.5–57° C.). Acidification of the alkaline extracts with dilute hydrochloric acid yielded a yellow oil, which crystallized after standing fifteen minutes and was collected by filtration; M. P. of crude product 116–119° C.; yield 8. g. (74% of theory). After recrystallization from aqueous acetic acid, petroleum ether (B. P. 60–68° C.) and aqueous ethanol, the acid was obtained as white platelets; M. P. 122.2–122.6° C.

*Anal.*—Calcd. for $C_{18}H_{18}O_2$; C, 81.19%; H, 6.81%; neut. eq., 266.3. Found: C, 81.47%; H, 6.88%; neut. eq., 266.6, 268.1.

The compound rapidly decolorized slightly alkaline permanganate solution and absorbed bromine in carbon tetrachloride solution with evolution of hydrogen bromide, as is characteristic of gamma, delta-unsaturated acids. Ozonization, followed by reductive decomposition with hydrogen over a palladium catalyst (Fischer, Düll and Ertel, Ber. 65, 1471 (1932)), gave acetaldehyde as the only water-soluble aldehyde isolated, which was identified as its dimedone derivative, M. P. 140–141° C.

EXAMPLE 2

*Synthesis of 2,2-diphenylhexen-4-oic acid by means of phenylmagnesium bromide*

The phenyl Grignard reagent prepared from 9.5 g. of bromobenzene and 1.5 g. of magnesium was added to 13.3 g. of isocrotyl diphenyl acetate in ether solution. The reaction mixture was allowed to stand overnight and then was processed in the manner described in Example 1. The acid formed by the rearrangement was isolated in a yield of 8.7 g. (66% of theory) and was identical with that described in Example 1.

EXAMPLE 3

*Synthesis of 2,2-diphenylhexen-4-oic acid by means of sodium hydride*

To a stirred solution of 6.6 g. of isocrotyl diphenyl acetate in 60 ml. of dry benzene, 2 g. of pulverized sodium hydride was added. The reaction mixture was refluxed under a dry nitrogen atmosphere, and the hydrogen evolved was collected in a gas burette. The reaction was completed in six hours, according to the hydrogen evolution. After the unchanged sodium hydride was decomposed by careful addition of methanol, the reaction mixture was thoroughly extracted with water and dilute sodium hydroxide. Acidification of the combined aqueous extracts caused the precipitation of 5.6 g. (85% of theory) of a product identical with the previously described rearrangement acid.

EXAMPLE 4

*2,2-diphenyl-3-methylpenten-4-oic acid*

By a procedure analogous to the method of Example 1 described above, 12.5 g. of n-crotyl diphenyl acetate dissolved in 25 ml. of dry ether was caused to react with the Grignard reagent prepared from 12.0 g. of bromomesitylene and 1.5 g. of magnesium. The acid formed by the rearrangement was obtained in a yield of 8.2 g. (66% of theory); M. P. 138–138.5° C. after recrystallization from aqueous ethanol. Ozonization followed by catalytic hydrogenation of the ozonide gave formaldehyde as the only water-soluble aldehyde isolated; M. P. of dimedone dvt., 187–188° C.; yield 52% of theory.

*Anal.*—Calcd. for $C_{18}H_{18}O_2$: C, 81.19%; H, 6.81%; neut. eq., 266.3. Found: C, 81.34%; H, 7.10%; neut. eq., 266.5.

EXAMPLE 5

*2,2-diphenylpenten-4-oic acid*

In a manner analogous to the rearranging of Example 1, 25 g. of allyl diphenyl acetate in 50 ml. of anhydrous ether was caused to react with the Grignard reagent prepared from 25 g. of bromomesitylene, 3.1 g. of magnesium and 75 ml. of ether. The yield of the acid formed by rearrangement was 11.9 g. (47% of theory); M. P. 141.5–141.9° C.

*Anal.*—Calcd. for $C_{17}H_{16}O_2$: C, 80.92%; H, 6.39%; neut. eq., 252.3. Found: C, 80.73%; H, 6.57%; neut. eq., 252.9, 253.3.

EXAMPLE 6

*Rearrangement of beta-methylallyl diphenyl acetate (preparation of 2,2-diphenyl-4-methyl-penten-4-oic acid)*

Eleven hundred milliliters of toluene was placed in a flask and distilled until 150 ml. was removed. This was done in order to dry the equipment thoroughly. Twenty-four grams of finely divided sodium hydride was added to the toluene under nitrogen and the temperature of the mixture raised to the boiling point. Beta-methylallyl diphenyl acetate (1 mole) dissolved in 200 ml. of dry toluene was added over a period of thirty (30) minutes and the whole refluxed for 22 hours after which time no more hydrogen was evolved.

Decomposition of the reaction mixture with water gave an aqueous phase which on acidification yielded seventy-five (75) per cent of 2,2-diphenyl-4-methylpenten-4-oic acid; M. P. 120–122° C.

*Anal.*—Calcd. for: C, 81.17%; H, 6.81%; neut. eq., 266.3. Found: C, 80.88%, 80.99%; H, 6.92%, 6.81%; neut. eq., 264.0, 264.6.

EXAMPLE 7

*Rearrangement of allyl alpha-phenylbutyrate (preparation of 2-ethyl-2-phenyl-penten-4-oic acid)*

Allyl alpha-phenylbutyrate (40.8 g.) was allowed to react with diethylaminomagnesium bromide (prepared from 14.6 g. of diethylamine and an equivalent of ethylmagnesium bromide) in ethereal solution for 3 days at room temperature. Decomposition of the reaction mixture with water and acidification of the aqueous phase gave 2-ethyl-2-phenylpenten-4-oic acid; M. P. 78.5–80° C. The compound readily decolorized aqueous permanganate.

*Anal.*—Calcd. for $C_{13}H_{16}O_2$: N. E., 204.3; C, 76.44; H, 7.90. Found: N. E., 204.8, 205.7; C, 76.81, 76.80; H, 7.99, 8.03.

EXAMPLE 8

*Rearrangement of allyl diphenyl acetate*

In a 2 liter three-necked flask equipped with a sealed stirrer, dropping funnel, nitrogen inlet tube, and arranged for distillation was placed one liter of pure benzene. Two hundred ml. of the benzene was distilled to remove water and the distillation outlet was replaced by a reflux condenser topped with a drying tube. Fifteen grams (0.625 mole) of sodium hydride was weighed into a nitrogen filled flask and then poured into the benzene while nitrogen was passed into the flask. The allyl diphenyl acetate dissolved in 100 ml. of dry benzene was added and the mixture stirred and refluxed overnight. The hydrogen evolution was slow. In the morning there was a heavy precipitate of the sodium salt of the product and there was still a slow hydrogen evolution. The mixture was cooled and absolute methanol was added to decompose sodium hydride. The decomposition was slow, and was completed by adding water under nitrogen. A total of 500 ml. of water was added, and after shaking in a separatory funnel the water layer was separated and the benzene extracted with 100 ml. of 5% sodium hydroxide and then 100 ml. of water. The combined, filtered aqueous layers were treated with cooling and stirring with 90 ml. of concentrated hydrochloric acid. A gummy semi-solid was obtained which soon crystallized. The dry powder weighed 58.4 g., M. P. 123–136° C. From the benzene solution there was obtained 53.7 g. of unchanged allyl diphenyl acetate. The solid acid was dissolved in 200 ml. of hot 95% ethanol and 150 ml. of water was gradually added to the heated solution. On slow cooling, beautiful colorless plates were obtained melting at 140.5–142° C., and after drying they weighed 47.4 g. This is 2,2-diphenyl-penten-4-oic acid.

EXAMPLE 9

*Rearrangement of allyl diphenyl acetate*

Toluene (1300 ml.) was placed in an apparatus identical to that described under Example 8 above, and 150 ml. of toluene was distilled. Eighteen grams (0.75 mole) of sodium hydride was added under nitrogen and 149 g. (0.592 mole) of allyl diphenyl acetate was added in 100 ml. of dry toluene. After 20 hours of refluxing there was no further evolution of hydrogen, so the reaction mixture was decomposed as described in Example 8 above. The alkaline extracts were extracted once with 300 ml. of toluene and were then placed in a 2 liter erlenmeyer flask equipped with a stirrer and cooled in an ice bath. A solution of 100 ml. concentrated hydrochloric acid in 100 ml. of water was added rapidly until the solution became cloudy, and then it was added dropwise and the mixture seeded. The wet filter cake after washing with water weighed 129 g. and was dissolved in 450 ml. of ethanol and 310 ml. of water were gradually added to the heated solution. The solution was cooled slowly and finally chilled. After filtering, washing and drying, 83.5 g. (56%) of the 2,2-diphenylpenten-4-oic acid was obtained melting at 141–142.5° C. This product had a light yellow color which could be removed by a recrystallization in which the solution was not chilled in the ice box, but cooled only under running tap water (30° C.).

EXAMPLE 10

*Preparation of allyl diphenylacetic acid*

960 g. (3.8 moles) of allyl diphenyl acetate
8 liters of A. R. grade toluene
120 g. (5 moles) of sodium hydride The toluene was placed in a twelve-liter, three-necked flask which was equipped with a dry nitrogen inlet, an addition funnel, a lightning stirrer, and a condenser arranged for downward distillation. The flask was heated and 800 cc. of toluene were distilled to dry the apparatus completely. The receiver was changed, and an additional 300 cc. of toluene were distilled to be used in transferring the ester to the reaction flask. The condenser was then arranged for refluxing and protected from the air by a calcium chloride tube. The drying tube was then connected to a section of rubber tubing which led outside the building. The air in the flask was then displaced by dry nitrogen, and the stirrer was removed momentarily while three sealed paraffin tubes containing 40 g. of sodium hydride (which had been ground in a mortar under nitrogen) apiece were added. The stirrer was replaced, and the paraffin tubes dissolved rapidly in the warm toluene. Heating was then continued and the toluene brought to reflux. The ester was then added rapidly, and at first the solution was slightly cloudy and almost no hydrogen was evolved. The solution gradually developed a brown (enolate) color and the hydrogen evolution become brisk. The sodium salt of the product slowly precipitated from solution, and the mixture was left refluxing and stirring vigorously overnight, while a slow stream of dry nitrogen was passed through the system.

After sixteen hours the hydrogen evolution had stopped, but the reaction was continued for an additional four hours. At this time heating was discontinued, and when the toluene had stopped refluxing 300 ml. of dry allyl alcohol were added very slowly at first and then in a fine stream. Heating was then resumed and the mixture refluxed for one hour to make certain that all the sodium hydride was decomposed. An ice bath was then substituted for the heater, and the cold mixture was stirred vigorously while 2.5 liters of water were added, slowly at first, under nitrogen. The mixture was stirred for fifteen minutes and then transferred to a separatory funnel. The lower aqueous layer was brown and somewhat emulsified. This layer was separated and the toluene washed once with water. The combined aqueous extracts were then extracted once with toluene, separated and placed in a large flask equipped with a stirrer and cooled in an ice bath. A solution of 450 cc. of conc. hydrochloric acid in 500 cc. of water was then added in a fine stream with stirring until the solution became cloudy. The mixture was scratched and seeded to cause crystallization, and the rest of the acid solution was added slowly. Toward the end of the addition, the product formed a pasty mass, and the mixture was left in the ice bath with occasional swirling for one hour to insure complete crystallization. The light tan solid was filtered and washed thoroughly with cold water. After pressing the product with a rubber dam, the moist cake was dissolved in two liters of boiling 95% ethyl alcohol and filtered under suction to remove a small amount of finely divided solid. The hot, red-brown filtrate was treated with 600 cc. of water, at which point crystallization began. The solution was allowed to cool slowly to room temperature and then was cooled for two hours in a tap water bath at 15° C. The hard crystalline mass was crushed, and after filtering the crystals were washed with a cold solution of 250 cc. of 95% alcohol in 250 cc. of water. After removing as much of the solvent as possible with a rubber dam, the crystals were placed in pans in a vacuum oven at 70° C. for seven hours. The nearly colorless (slight tan color) crystals weighed 722 g. (75.2% yield) and melted at 140.5 to 142° C.

EXAMPLE 11

Beta-methylallyl diphenyl acetate in an equivalent amount was substituted for the allyl diphenyl acetate in the preceding example and the process therein described repeated to produce a yield of 2,2-diphenyl-4-methyl-penten-4-oic acid in a yield of approximately the same order of magnitude.

While various modifications of the above invention have been described, it is to be understood that this invention is not limited thereto, but may be varied within the scope of the following claims.

I claim as my invention:

1. Process of preparing allylic substituted acetic acids having the following formula:

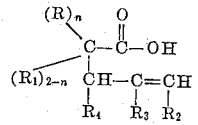

in which R is an aromatic radical, $R_1$ is an aliphatic hydrocarbon radical, $R_2$, $R_3$ and $R_4$ are selected from the group consisting of hydrogen and aliphatic radicals, and $n$ is an integer not greater than 2 which comprises reacting an ester having the following formula:

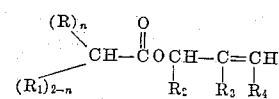

with an active metal hydride capable of converting said ester to an anion and rearranging said anion to introduce the allylic group into the alpha position to the carbonyl group.

2. Process of preparing allylic substituted acetic acids having the following formula:

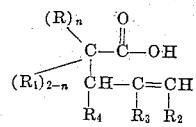

in which R is an aromatic radical, $R_1$ is an aliphatic hydrocarbon radical, $R_2$, $R_3$ and $R_4$ are selected from the group consisting of hydrogen and aliphatic radicals, and $n$ is an integer not greater than 2 which comprises reacting an ester having the following formula:

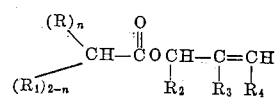

with an active metal alkoxide capable of converting said ester to an anion and rearranging said anion to introduce the allylic group into the alpha position to the carbonyl group.

3. Process of preparing allylic substituted acetic acids having the following formula:

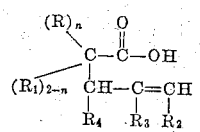

in which R is an aromatic radical, $R_1$ is an aliphatic hydrocarbon radical, $R_2$, $R_3$ and $R_4$ are selected from the group consisting of hydrogen and aliphatic radicals, and $n$ is an integer not greater than 2 which comprises reacting an ester having the following formula:

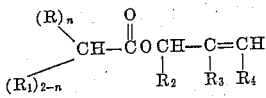

with an active metal amide capable of converting said ester to an anion and rearranging said anion to introduce the allylic group into the alpha position to the carbonyl group.

4. Process of preparing allylic substituted acetic acids having the following formula:

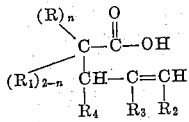

in which R is an aromatic radical, $R_1$ is an aliphatic hydrocarbon radical, $R_2$, $R_3$ and $R_4$ are selected from the group consisting of hydrogen and aliphatic radicals, and $n$ is an integer not greater than 2, which comprises reacting an ester having the following formula:

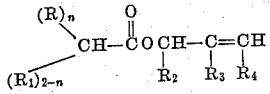

with a Grignard reagent capable of converting said ester to an anion and rearranging said anion to introduce the allylic group into the alpha position to the carbonyl group.

5. Process of preparing allylic substituted acetic acids having the following formula:

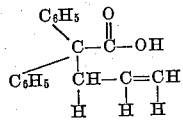

which comprises reacting an ester having the following formula:

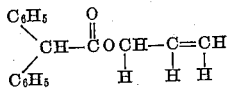

with an active metal hydride capable of converting said ester to an anion and rearranging said anion to introduce the allylic group into the alpha position to the carbonyl group.

6. Process of preparing allylic substituted acetic acids having the following formula:

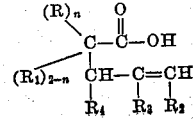

in which R is an aromatic radical, $R_1$ is an aliphatic hydrocarbon radical, $R_2$, $R_3$ and $R_4$ are selected from the group consisting of hydrogen and aliphatic radicals, and $n$ is an integer not greater than 2, which comprises reacting an ester having the following formula:

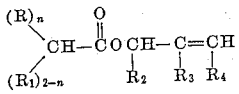

with a basic reagent capable of converting said ester to an anion, said basic reagent being selected from the group consisting of active metal hydrides, active metal alkoxides, active metal amides, and Grignard reagents, and rearranging said anion to introduce the allylic group into the alpha position to the carbonyl group.

7. Process of preparing allylic substituted acetic acids having the following formula:

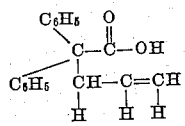

which comprises reacting an ester having the following formula:

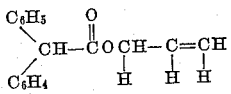

with an active metal amide capable of converting said ester to an anion and rearranging said anion to introduce the allylic group into the alpha position to the carbonyl group.

RICHARD T. ARNOLD.

REFERENCES CITED

The following references are of record in the file of this patent:

UNITED STATES PATENTS

| Number | Name | Date |
|---|---|---|
| 2,164,188 | Groll et al. | June 27, 1939 |

OTHER REFERENCES

Kimel et al.: Chem. Abstracts, vol. 38, col. 66 (1944).

Adams et al.: "Organic Reactions" (Wiley), vol. 2, pp. 2-6 (1944).

Certificate of Correction

October 17, 1950

Patent No. 2,526,108

RICHARD T. ARNOLD

It is hereby certified that error appears in the printed specification of the above numbered patent requiring correction as follows:

Column 1, line 40, for that portion of the formula reading "—C—CH" read —C=CH; column 4, line 16, for "8. g." read *8.5 g.*; line 55, for "notrogen" read *nitrogen*; column 5, line 36, for "temperautre" read *temperature*; and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*